United States Patent [19]

Böhnstedt et al.

[11] Patent Number: 5,773,079
[45] Date of Patent: Jun. 30, 1998

[54] PROCESS FOR REPAIRING BATTERY SEPARATORS

[75] Inventors: Werner Böhnstedt, Henstedt-Ulzburg; Klaus Heinrich Ihmels; Karsten Fischer, both of Hamburg; Jürgen Ruhoff, Norderstedt, all of Germany

[73] Assignee: Daramic, Inc., Germany

[21] Appl. No.: 461,369

[22] Filed: Jun. 5, 1995

[30] Foreign Application Priority Data

Dec. 12, 1994 [DE] Germany ............... 44 46 675.7

[51] Int. Cl.⁶ .................................................. B32B 32/00
[52] U.S. Cl. .................. 427/140; 427/243; 427/256; 427/393.5
[58] Field of Search ................... 427/140, 243, 427/393.5, 256

[56] References Cited

U.S. PATENT DOCUMENTS

| | | | |
|---|---|---|---|
| 3,980,456 | 9/1976 | Browall | 427/140 |
| 4,453,991 | 6/1984 | Grot | 427/140 |
| 4,535,112 | 8/1985 | McCain et al. | 524/233 |
| 4,584,233 | 4/1986 | Meader | 427/140 |
| 5,266,350 | 11/1993 | Grob | 427/140 |
| 5,273,694 | 12/1993 | Perusich et al. | 264/41 |
| 5,356,663 | 10/1994 | Perusich et al. | 427/140 |

FOREIGN PATENT DOCUMENTS

| | | |
|---|---|---|
| 0 039 897 | 11/1981 | European Pat. Off. . |
| 0 079 218 | 5/1983 | European Pat. Off. . |
| 2066824 | 7/1991 | United Kingdom . |

*Primary Examiner*—Janyce Bell
*Attorney, Agent, or Firm*—Nields, Lemack & Dingman

[57] ABSTRACT

Process for repairing manufacturing defects in porous separator webs for accumulators in which a repair material is deposited in targeted manner onto the defect in-line repair as production of the separator web proceeds and the defect is thus sealed, or in which the defect is heated in-line at certain points and thereby welded. Suitable as repair materials are in particular polymers and/or resins dispersible in a dispersion agent, polymerizable materials and hot-melts. Welding preferably takes place using ultrasonics.

11 Claims, No Drawings

PROCESS FOR REPAIRING BATTERY SEPARATORS

The present invention relates to a process for repairing defects in battery separators. The process comprises the targeted deposition of a repair material onto the defect or the heating of the defective site at certain points.

Battery separators are used in accumulators in order to prevent direct contact and therefore short circuits between the electrode plates. The separators are manufactured from porous acid- and oxidation-resistant materials, the pore size being selected such that it permits an ionic flow of current through the membrane, but prevents the passage of through-growths and particles which have detached themselves from the accumulator plates.

A distinction is drawn between macroporous separators having an average pore diameter of approximately 10 to 30 $\mu$m and microporous separators having an average pore diameter of less than 1 $\mu$m. The danger of penetration by particles and by through-growths and therefore the danger of short circuits is particularly small in the case of microporous separators because of the smaller pore size. Lead accumulators equipped with microporous separators therefore usually have an increased lifespan.

In general, separators are used in the form of plug-in or pocket separators. Plug-in separators are produced as piece goods and cut to the required height and width by the separator manufacturer. They are relatively rigid and, during battery manufacture, are introduced as such between the accumulator plates. Pocket separators are produced as a rule as continuous product having the desired width and cut to a pre-set length in a fully automated process and shaped to give pockets only on reaching the battery manufacturer. These pockets, which are closed on three sides, serve to accommodate the accumulator plates.

One problem with the production of separators is the formation of defects, i.e. of holes with a substantially larger diameter than that of the membrane pores. Such defects increase the danger of short circuits and reduce the lifespan of the accumulators, since through-growths and particles which have become detached from the electrode plates can easily pass through these holes. The danger of short circuits is particularly high in the case of pocket separators, because here the particles which have become detached from the accumulator plates do not, as is the case with open plug-in separators, fall into a sediment chamber, but remain in the pocket.

Whilst it is possible to eliminate defective product without problems in the case of plug-in separators, in the case of continuous product, the detected holes are generally identified only by a marking which allows the battery manufacturer to eliminate the defective section after cutting to size. In order to keep the expenditure associated with elimination as low as possible, the battery manufacturers usually prescribe a maximum number of defects per unit of length of the continuous product. Goods which exceed this specified number are not accepted by the battery manufacturer and must therefore be thrown away.

In contrast to the case of separator piece goods, the elimination of defective continuous product therefore involves either the battery manufacturer or the separator manufacturer in a considerable expense together with significant productivity losses. Known from DE-OS 43 28 954 and US-A-4 535 112 are processes and means for repairing non-porous ion exchange membranes and films based on fluorinated carboxy polymers. For the repair, solutions of fluorinated carboxy polymers or of mixtures of fluorinated carboxy- and sulphonic polymers are deposited onto the damaged site, and the solvent is then evaporated off. Deposition preferably takes place manually in several layers, whereby heavily stressed membranes are provided with a strengthening material in an additional step. The described processes are involved and require relatively high temperatures and long drying times. Further, all that is described is the manual repair of individual defects which have formed as a result of mechanical stresses on the membranes in the electrolysis cell.

It is the object of the present invention to provide a process for repairing manufacturing defects in porous separators for accumulators, in particular in continuous product for the manufacture of pocket separators. The process is to permit a rapid and permanent repair of the defects and be suitable for the "in-line" repair of separators.

The repaired site provided by the process is to have a high resistance to acid, good adhesion and a good flexibility. Furthermore, the repair materials used should be compatible with customary separator materials, i.e. for example contain no solvents which damage the separators.

This object is achieved by a process in which a suitable repair material is deposited onto the site to be repaired or the site to be repaired is heated at certain points and is simultaneously pressed together if necessary.

Suitable as repair materials are especially polymer and resin dispersions which are deposited in a thin layer onto the separator web and, after deposition, are applied to the defective site by evaporating the dispersion medium to form a film. The thickness of the film after evaporating the solvent is preferably 0.01 to 0.1 mm. Suitable for this are all polymer and resin dispersions which form a flexible acid-resistant film which adheres well to the separator. The suitability of a dispersion can be readily ascertained experimentally in each case, for example by storing the repaired separator in hot 37% $H_2SO_4$, followed by breaking tests (bending by approx. 180°) in the region of the repaired defect. The adhesion of the coating is then assessed, the film is not to separate from the surface of the separator during this treatment. Polymer and resin dispersions based on acrylic acid, acrylic acid esters, methacrylic acid and/or methacrylic acid esters are preferred. Particularly suitable are acrylic resin dispersions (e.g. Primal HA-8, Rohm und Haas, Frankfurt), mixtures of polyacrylic acid ester dispersions and acrylic resin dispersions (e.g. 2 parts by wt. Acronal 30 D (acrylic acid methyl ester, BASF) and 1 part by wt. Primal HA-16) and mixtures of acrylic acid ester dispersions and copolymer dispersions based on vinylidene chloride (e.g. 1 part by wt. Acronal 30 D and 1 part by wt. Diofan 233 D (BASF)).

To facilitate processibility e.g. during spray application, the dispersions or their mixtures can be diluted with a suitable solvent, preferably in a quantity of up to 2 parts by wt. solvent per part by wt. of dispersion. The preferred solvent is water. In this way the viscosity of the dispersions can be adjusted almost according to choice.

To improve the optical appearance of the repair site the dispersions can additionally be matched to the colour of the separator material using standard commercial pigments such as for example carbon black or titanium dioxide. The dispersions are preferably dyed in such a way that the repair site no longer appears transparent upon visual or optoelectronic inspection.

Also suitable as repair materials are polymerizable materials, such as liquid acrylate monomers and acrylate oligomers and mixtures thereof which are deposited as a thin layer onto the separator web and are polymerized onto the defective site after deposition. The thickness of the polymerized layer is preferably 0.01 to 0.1 mm. Suitable for this are all monomers and oligomers which, after polymerization, form a flexible, acid-resistant film which adheres well to the separator. Here, too, the suitability of a material in each case can be readily determined experimentally, as described above. Polymerizable materials based on acrylic acid, acrylic acid esters, methacrylic acid and/or methacrylic acid esters are preferred. Particularly preferred are 2-phenoxyacrylate monomer (e.g. Sartomer 339, Cray Valley, Tonisvorst), epoxidized soya bean oil-acrylate oligomer (e.g. Craynor 111, Cray Valley), mixtures of 2-phenoxyacrylate monomer and epoxidized soya bean oil-acrylate oligomer, in particular in the wt. ratio of 1:1 to 1:9 (e.g. 1 part Sartomer 339 and 1 or 9 parts Craynor 111), mixtures of urethane acrylate oligomer (e.g. Photomer 6162, Ackros, Siegburg) and 2-phenoxyacrylate monomer, in particular in the ratio of 1:1 to 9:1 (e.g. 1 or 9 parts Photomer 6162 and 1 part Sartomer 339), mixtures of epoxidized soya bean oil-acrylate oligomer and urethane acrylate oligomer, in particular in the ratio of 1:2 to 1:3 (e.g. 1 part Craynor 111 and 2 or 3 parts Photomer 6162), and epoxyarylate (e.g. Photomer 3005, Akcros, Siegburg).

To facilitate processibility e.g. during spray application, the polymerizable materials or their mixtures can be diluted with a suitable solvent, preferably in a quantity of up to 2 parts by wt. solvent per part by wt. of the polymerizable material. Preferred solvents are ethanol and isopropanol. As a rule, the solvent is evaporated prior to polymerization. Particularly suitable materials are mixtures of epoxidized soya bean oil-acrylate oligomer (e.g. Craynor 111)/urethane acrylate oligomer (e.g. Photomer 6162)/isopropanol in the ratio 1:2:3 or 1:3:4 (parts by weight).

In similar manner as the dispersions, the polymerizable materials can be matched to the colour of the separator, preferably in such a way that the repair site no longer appears transparent. Compared with the non-dyed materials, adhesion to the separator, film formation and hardening time can, however, be negatively influenced in some cases.

Polymerization can be initiated by light, electronic radiation, heat, moisture or the admission of air, whereby initiation by heat and photoinitiation are preferred. The mixtures are preferably mixed with a suitable polymerization initiator, particularly preferably with a photoinitiator or heat initiator. In a quite particularly preferred embodiment the mixtures additionally contain a co-initiator. Isopropyl thioxanthone is preferred as photoinitiator and ethyl-4-(dimethylamino)benzoate as co-initiator.

The aforementioned repair materials can be deposited by any suitable method, such as spraying, rolling or painting onto the site to be repaired. Methods which permit a contact-free deposition of the repair materials, such as for example spraying, are preferred.

Another variant of the process according to the invention consists in depositing a hot-melting composition (hot-melt) onto the site to be repaired. Hot-melts based on polyethylene are preferred. This composition is preferably pressed with a heated stamp onto the repair site and then hardened by cooling the repair material. One material particularly preferred for this purpose is marketed by PKL (Linnich) under the name Smeltan 52-068. The viscosity, flexibility and adhesion behaviour of the hot-melt can be influenced by the choice of molecular weight of the material.

After depositing a repair material, it is possible to eliminate defects by heating at certain points and welding. Ultrasonics in particular is suitable for this. The site to be repaired is preferably lightly pressed at the same time during welding in order to accelerate welding of the defect.

The process according to the invention is particularly suitable for repairing macro- and microporous separators which consist of a thermoplastic, such as for example polyvinyl chloride, polyethylene, polypropylene or their mixtures and optionally a filler.

The repair sites display a high flexibility, and the separators repaired according to the process according to the invention can be further processed without problems to give pockets. This applies in particular even to those separators having repair site(s) lying in critical regions such as in the fold of the lower edge of the pocket or in the welding region of the pocket. The repaired sites do not lead to problems either upon folding or upon welding.

In general, battery separators have raised stiffening ribs. The base region of the ribs represents a further problem area in the repair of separators, since particularly high mechanical stresses can occur here. Here, too, the process according to the invention, in all variations, allows a certain and permanent repair of defects.

The repair materials used adhere in excellent manner to the separator surface and the pocket separators produced from the repaired separators are the same in every respect as pocket separators produced from non-repaired material as regards their resistance to acids, mechanical strength and service life.

The influence of a repair site on the internal resistance of an accumulator is negligibly small. Based on a cell with six separator pockets each having an area of 24 cm×15 cm or 2×12 cm×15 cm and a separator resistance of 60 m$\Omega$ cm$^2$, the separators contribute 0.180 m$\Omega$ to the internal resistance of the cell. A repair site of 9 cm$^2$ would increase the internal resistance attributable to the separators to 0.18081 m$\Omega$ which, in a cold-start test of the battery carried out according to DIN 43539-02, results in an arithmetical decrease in the voltage from typically 9.3000 volts (30 sec value) to 9.2998 volts.

The productivity losses caused by eliminating defective continuous product and the battery failures caused by the incomplete elimination of defective material can be avoided in simple and effective way without noteworthy disadvantages by the repair process according to the invention.

The process is suitable for "in-line" repair as production of the separator web proceeds, the expenditure required for repair being scarcely higher than the expenditure for marking defects. In general, a single deposition of the repair material onto the defect is sufficient for the permanent repair. Defects are detected in the way known from the prior art.

The invention is described in more detail below with reference to embodiments.

EMBODIMENTS

EXAMPLE 1

10 g 2-phenoxyethylacrylate were mixed with 0.05 g isopropyl thioxanthone (photoinitiator) and 0.10 g ethyl-4-(dimethylamino) benzoate (co-initiator). This solution was sprayed with a compressed-air-driven laboratory spraying unit with electrovalve control and a slot die (Teejet 650017, Spraying Systems, Hamburg) onto a hole with a diameter of 0.3 mm in a separator made from filled polyethylene. The film was cured for 5 seconds under a UV lamp (180 to 450 nm, output 3 kW, IST-Rdhre model MCX). The cured film sealed the hole completely, was very flexible and adhered to the separator in excellent manner. After 1 week's treatment of the repair site at 80° C. in 37% sulphuric acid the repair site showed no change.

EXAMPLE 2

Example 1 was repeated, but using epoxidized soya bean oil acrylate instead of 2-phenoxyethylacrylate in the same quantity. Because of the relatively high viscosity of the mixture the solution was painted onto the hole. Test conditions and results corresponded to those in Example 1.

Example 3

Example 1 was repeated, but using a mixture of equal parts of 2-phenoxyethylacrylate and epoxidized soya bean oil acrylate instead of the 2-phenoxyethyl-acrylate. The mixture had a relatively low viscosity and was able to be sprayed onto the separator. The test results corresponded to those in Example 1.

EXAMPLE 4

Example 1 was repeated, but using a solution of epoxidized soya bean oil-acrylate in isopropanol (1:1) instead of 2-phenoxyethylacrylate. The solution had a relatively low viscosity and was able to be sprayed onto the separator. Prior to irradiation with the UV lamp, the solvent was evaporated by blowing on it for approx. one minute with a hot-air blower; the other test conditions and results corresponded to those in Example 1.

EXAMPLE 5

A mixture of 1 part Acronal® 30 D (acrylate dispersion, BASF), 1 part Diofane® 233 D (vinylidene chioride/acrylate dispersion, BASF) and 2 parts water was sprayed onto a hole having a diameter of 0.3 mm in a separator made from filled polyethylene. By drying for 5 minutes in a circulating-air oven at 100° C., a sealed, flexible, well-adhering film which completely covered the hole was produced, which showed no change after 1 week's treatment at 80° C. in 37% sulphuric acid.

EXAMPLE 6

A hot-melt heated to 150° C. (Smeltan 52-068, PKL) was applied to a stamp, likewise heated to 150° C., whose planar stamping area had a conical bore approximately 1.5 to 2.0 mm deep in the centre. The stamp with the plastic hot-melt was pressed onto a defective site in the separator web, whereupon the plastic and viscous hot-melt was pressed in to the hole by pressure applied by hand. After a few seconds the hot-melt solidified and the hole was permanently sealed in grafted manner by the hot-melt. Excess solidified hot-melt did not have to be removed in addition after cooling.

EXAMPLE 7

To weld holes using ultrasonics, an ultrasonic generator from KLN, System 585 and a KLN ultrasonic head, apparatus model 250/707, was used. A sonotrode with the model number SoL 908 (40 kHz) was used.

The sonotrode was pressed onto the site of a 0.25 mm thick separator made from filled polyethylene in which the hole was situated. The hole had a diameter of approximately 0.3 mm. The distance between anvil and sonotrode was set to 0.20 mm in order to exert a certain pressure onto the separator material to be welded and thus to promote welding. Because of the mechanical oscillation energy of the sonotrode, the separator was heated at the site in question and the hole was welded shut as a result of the applied pressure by the plastic mouldable material of the heated separator. A visual examination of the separator on a light box showed that the hole was sealed.

We claim:

1. Process for repairing manufacturing defects in porous separator webs for accumulators, said defects comprising at least one hole in said porous separator web having a diameter larger than the diameter of the pores in said porous separator web, characterized in that a repair material selected from the group consisting of polymer and resin dispersions, polymerizable monomers and oligomers, and hot-melting compositions based on polyethylene is deposited onto the defect in-line as production of the separator web proceeds and the defect is thus sealed.

2. Process according to claim 1, characterized in that a polymer and/or resin which is dispersible in a dispersion agent is used as repair material and the dispersion agent is removed by evaporation after deposition.

3. Process according to claim 2, characterized in that a polymer and/or resin based on acrylic acid, acrylic acid esters, methacrylic acid and/or methacrylic acid esters is used.

4. Process according to claim 1, characterized in that a polymerizable material is used as repair material and is polymerized after deposition onto the defect.

5. Process according to claim 4, characterized in that a polymerizable material based on acrylic acids, acrylic acid esters, methacrylic acid and/or methacrylic acid esters is used.

6. Process according to one of claims 4 or 5, characterized in that 2-phenoxyethylacrylate and/or epoxidized soya bean oil-acrylate is used as acrylate monomer.

7. Process according to one of claims 4 or 5, wherein said polymerizable material comprises a polymerization initiator.

8. Process according to claim 1, characterized in that a hot-melting composition based on polyethylene is used as repair material and is hardened by cooling after deposition onto the defect.

9. Process according to one of claims 1, 2, 3, 4, 5, or 8, characterized in that the separator consists of a thermoplastic.

10. Process according to claim 1, characterized in that the separator consists of a thermoplastic selected from the group consisting of PVC, polyethylene, polypropylene and mixtures thereof, and optionally a filler.

11. Process according to claim 1, characterized in that the separator is present in the form of a continuous product.

* * * * *